No. 625,353. Patented May 23, 1899.
M. POSTTLETHWAIT.
CULTIVATOR.
(Application filed Oct. 5, 1898.)
(No Model.)
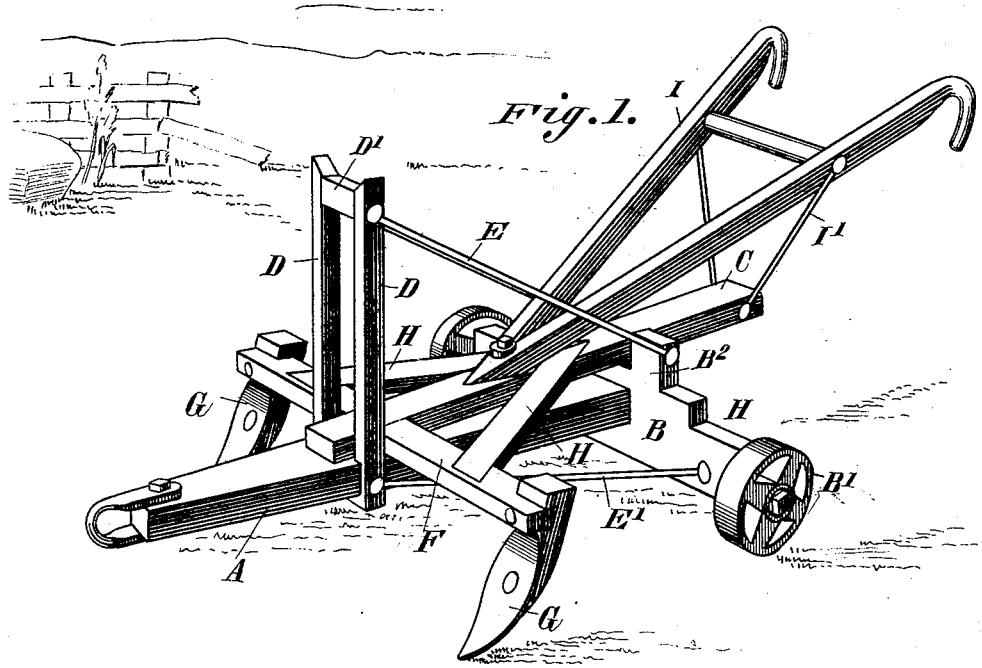
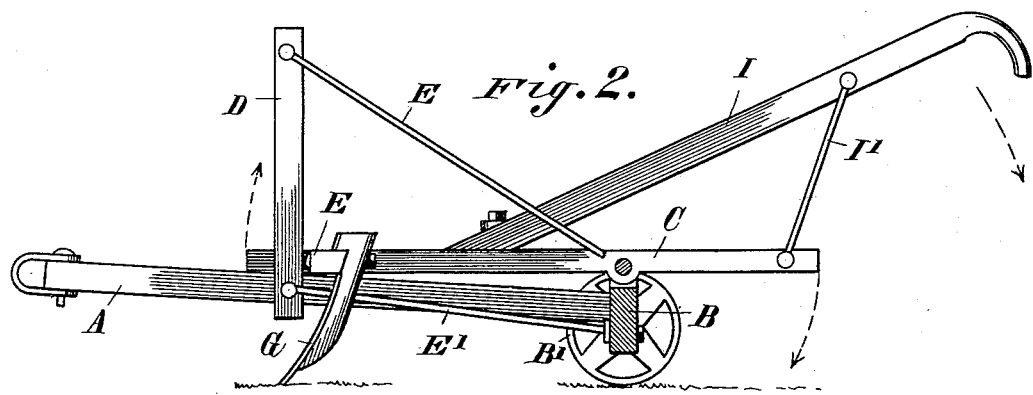
Witnesses
F. W. Riley
Chas. D. Brock
Inventor
Malinda Posttlethwait,
by O. Marate
Attorneys

UNITED STATES PATENT OFFICE.

MALINDA POSTTLETHWAIT, OF POTOSI, MISSOURI.

CULTIVATOR.

SPECIFICATION forming part of Letters Patent No. 625,353, dated May 23, 1899.

Application filed October 5, 1898. Serial No. 692,743. (No model.)

*To all whom it may concern:*

Be it known that I, MALINDA POSTTLE-THWAIT, a citizen of the United States, residing at Potosi, in the county of Washington and State of Missouri, have invented a new and useful Plow, of which the following is a specification.

This invention relates generally to plows, and more particularly to a cultivator-plow, the object being to provide a cheap and simple construction of cultivator in which the plows or shovels can be readily raised or lowered by hand, as desired; and with this object in view my invention consists, essentially, in providing a supplemental beam upon the main beam, which supplemental beam carries cultivator shovels or plows and can be readily raised or lowered by hand.

The invention consists also in certain details of construction and novelties of combination, all of which will be fully described hereinafter and pointed out in the claims.

In the drawings forming part of this specification, Figure 1 is a perspective view of the cultivator or plow constructed in accordance with my invention. Fig. 2 is a side view, partly in section.

In carrying out my invention I employ a main beam A, which is attached at its rear end to a bolster or axle B, having the ground-wheels B' connected therewith. The axle or bolster B has two parallel standards B², between which is pivoted the supplemental beam C, the forward end of the supplemental beam working between the guide-standards D, attached to the main beam A about midway its length and connected at their upper ends by means of a suitable cross-block D'. The guide-standards are braced at their upper and lower ends by means of the brace-rods E and E', respectively, which extend from the said guide-standards to the bolster or axle B. The supplemental beam C carries a cross-beam or toothed bar F adjacent to the forward end and directly to the rear of the guide-standards D, and the cultivator teeth or plows G are attached to the outer ends of this cross-beam or toothed bar, as most clearly shown, said bars being braced by means of beams H. Handles I are attached to the supplemental beam in the usual manner and braced by means of a rod I' in the usual way.

The manner of using my improved cultivator or plow will be clear to every one skilled in the art to which it relates, as it will be readily seen that whenever it is desired to raise the plows it will only be necessary to bear upon the handles, and the reverse operation will serve to throw them deeper into the soil.

If desired, a series of perforations can be made in the guide-standards and through which a supporting-pin can be passed for the purpose of holding the toothed bar in any desired adjustment.

Having thus fully described my invention, what I claim as new, and desire to secure by Letters Patent, is—

1. The combination with the main beam mounted upon ground-wheels, of a supplemental beam pivoted above the main beam, and carrying toothed bar and handles, substantially as shown and described.

2. The combination with the main beam, attached to the axles, the bolster carrying the ground-wheels, of the supplemental beam pivoted upon the axle or bolster and carrying the toothed bar and handles, substantially as shown and described.

3. The combination with the main beam, of the bolster and ground-wheels, the supplemental beam or toothed bar and handles, and the guide-standards, all arranged and adapted to operate, substantially as shown and described.

4. In a device of the kind described, the combination with the main beam, bolster and ground-wheels, of the supplemental beam pivoted between standards arranged upon the bolster, the guide-standards attached to the main beam, the toothed bar carried by the supplemental beam near its forward end and rear of the guide-standards, the brace beams and rods and the handles all arranged and adapted to be operated substantially as shown and described.

MALINDA POSTTLETHWAIT.

Witnesses:
JNO. MACLAY,
P. E. DAUGHERTY.